Oct. 25, 1960  J. F. PRIBONIC  2,957,704
FLUID DELAYED VALVE CONTROL FOR SUSPENSION SYSTEM
Filed Sept. 27, 1956  2 Sheets-Sheet 1

INVENTOR.
John F. Pribonic
BY
HIS ATTORNEY

Oct. 25, 1960                J. F. PRIBONIC                2,957,704
             FLUID DELAYED VALVE CONTROL FOR SUSPENSION SYSTEM
Filed Sept. 27, 1956                                   2 Sheets-Sheet 2
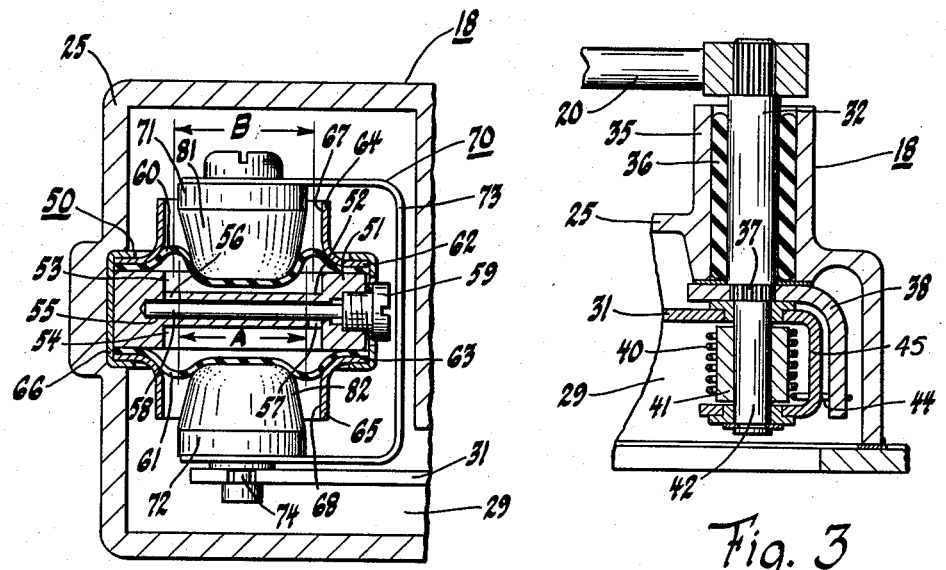
Fig. 4
Fig. 3
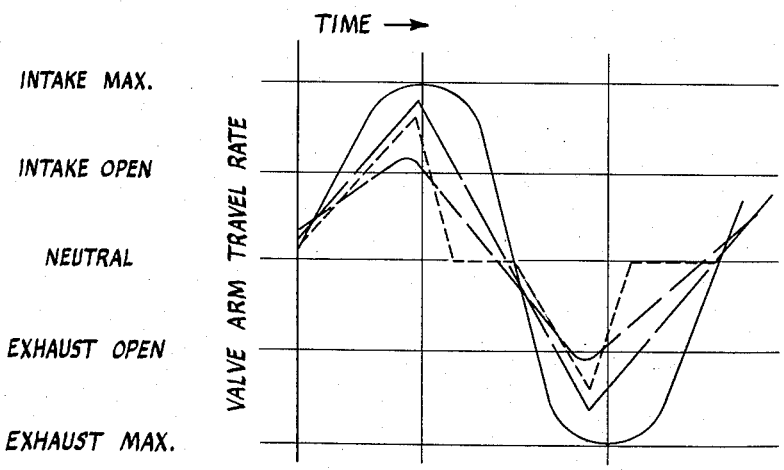
Fig. 6
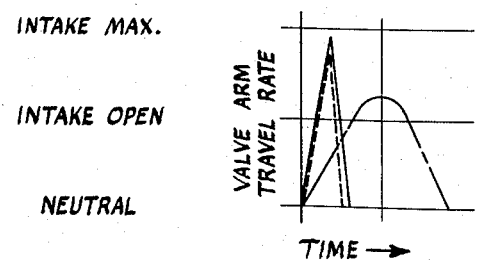
Fig. 5
INVENTOR.
John F. Pribonic
BY
HIS ATTORNEY

United States Patent Office 2,957,704
Patented Oct. 25, 1960

2,957,704

FLUID DELAYED VALVE CONTROL FOR SUSPENSION SYSTEM

John F. Pribonic, Dayton, Ohio, assignor to General Motors Corporation, Detroit, Mich., a corporation of Delaware Filed Sept. 27, 1956, Ser. No. 612,410

15 Claims. (Cl. 280—124)

This invention relates to a control mechanism for a fluid suspension system of a motor vehicle.

The fluid suspension system for the motor vehicle consists of a resilient fluid spring that is placed between the sprung mass and the unsprung mass of the vehicle. Preferably, the resilient fluid spring comprises a flexible bellows that is mounted between the chassis and axle of a motor vehicle with the bellows being filled with air under pressure to maintain a predetermined clearance height between the sprung mass, that is the chassis, and the unsprung mass, that is the axle of the vehicle.

It is desirable to maintain a predetermined clearance height between the sprung mass and the unsprung mass of the vehicle irrespective of the load that is carried by the vehicle. Thus when passengers board a vehicle it is desirable to have the air pressure in the air springs increased to support the increased load and thereby maintain the predetermined clearance height between the chassis and the axle. Conversely, when passengers leave a vehicle, the air that was previously admitted into the air spring must be exhausted to allow the chassis to return to the initial predetermined clearance height.

To control the aforementioned action of supply of air under pressure to an air spring and exhaust of air from an air spring, a control valve is located on the chassis of the vehicle with a suitable connecting link extending into engagement with the axle. Thus when the chassis moves downwardly relative to the axle, because of increasing load, the control valve will allow air under pressure to be admitted into the air springs, and conversely when the load in the vehicle lightens and the chassis moves upwardly relative to the axle, the valve will permit exhaust of air from the air spring to reestablish the predetermined clearance height between the chassis and the axle.

In air suspension systems of the aforementioned type it is desirable to establish an operation of the control valve for supply and exhaust of air to the air springs wherein the response of the valve to changes in clearance height between the chassis and the axle is rapid under a static loading condition, but the response is delayed under dynamic conditions, that is when the vehicle is operating on the road. The purpose of this is to provide for an immediate correction in height relation between the body and the axle of the car when passengers board or leave a vehicle. However, when the car is operating over the road, the rapid oscillations imparted to the wheel by rough road conditions must be averaged out so that the rapid oscillations will not effect a change in height relation between the car chassis and the axle. Thus the response of the control valve must be less sensitive under these dynamic conditions than under the static conditions.

It has been found that if the response of the control valve is made sufficiently sensitive for obtaining a rapid response under static loading conditions, the response of the valve is too sensitive for control of the air to the air spring under dynamic road operating conditions, with the result that the valve is constantly being opened and closed and a large volume of air is required for maintenance of the height relation between the car body and the axle.

On the other hand, if the response of the valve is made sufficiently slow so that the rough road oscillations can be averaged out, then the response of the valve becomes so slow that a considerable time elapse occurs before height correction is made under static conditions.

Still further, it has been discovered that conventional shock absorbers used with air suspension systems cause a gradual reduction of the predetermined height clearance between the car chassis and the axle when the vehicle is operating over rough road conditions. The shock absorber in effect ratchets the car chassis down toward the axle because the resistance valving on the rebound stroke of the shock absorber is greater than the resistance of the valving on the compression stroke of the shock absorber. The end result is that under rough road conditions the rebound valving does not allow the shock absorber to extend fully to its initial length before another stroke of the shock absorber occurs, the result being a pulling down of the car chassis relative to the axle.

When this occurs under conditions where the delay time of the control valve for the air spring is a "short delay time," to wit, delay times of one-half second or less, the control valve provides an immediate height correction for the air suspension system upon every two or three oscillations of the shock absorber. Here again a large volume of air is constantly being supplied and exhausted alternately from the air spring. On the other hand, the more desirable system is to use a control valve having a "long delay" period, to wit, one second or greater, so that the oscillations of the shock absorber are averaged out by the control with the result that the height corrections made are at much longer intervals and a considerably lesser quantity of air is used in the correction system. But here again the long delay period of the control valve is unsatisfactory from the standpoint of height correction under static loading conditions.

It is therefore an object of this invention to provide a suspension system for a vehicle in which a sprung mass is supported upon an unsprung mass by means of a resilient fluid spring, the control of the supply of fluid under pressure to the fluid spring and exhaust of fluid from the fluid spring is under regulation of a control device that is regulated in a manner that the device has one rate of delay in moving from a neutral position and a different and lower rate of delay when returning to a neutral position. The control apparatus consists of a valve mechanism that responds to average relative movement between the car body and the car axle, the operation of the valve mechanism being controlled by a delay device or damper that has a neutral position when the valve mechanism is in neutral position. The delay device is arranged to effect the time delay in the operation of the valve mechanism at one rate of movement when the valve moves from neutral toward either a fluid pressure inlet or exhaust position and a different and higher rate of movement when the valve returns to its neutral position. The arrangement is such therefore that the control provides for a rapid response of the mechanism under static conditions and is balanced to effect an averaging of the wheel oscillations under dynamic conditions.

It is another object of the invention to provide a control apparatus for a fluid suspension system for a motor vehicle wherein the control valve for supplying and exhausting fluid to and from the air spring of the system is regulated by a damping device or fluid filled dash pot that has the fluid maintained under pressure in the dash pot whereby to cancel out the effect of expansion of the fluid due to variance in operating temperature, and also provide a device that normally is in a state of equilibrium so that the movable member of the dash pot is held normally in a neutral position, the dash pot being constructed and arranged in a manner that movement of the movable member in either direction from neutral creates a condition of pressure instability within the dash pot which tends to urge the movable member back to its neutral position.

The foregoing effect is created by establishing an equilibrium of forces in the dash pot tending to hold the movable member in a neutral position, which can be accomplished either by springs operating in opposed relationship or by cooperating changes in the effective pressure area of a pair of diaphragms acted on by pressure fluid so that the hydraulic forces of the fluid tend to reestablish the diaphragms to a position in which there exists an equilibrium of forces on the diaphragms thereby holding the movable member of the dash pot in its neutral position.

Further objects and advantages of the present invention will be apparent from the following description, reference being had to the accompanying drawings wherein a preferred form of the invention is clearly shown.

In the drawings:

Figure 3 is a cross sectional view of the control valve taken along line 3—3 of Figure 2.

Figure 4 is a cross sectional view of the detaining device illustrated in a position of instability and from which it tends to return to a neutral position.

Figures 5 and 6 are graphic illustrations of the operation of control valves under static and dynamic conditions respectively.

Figure 1:
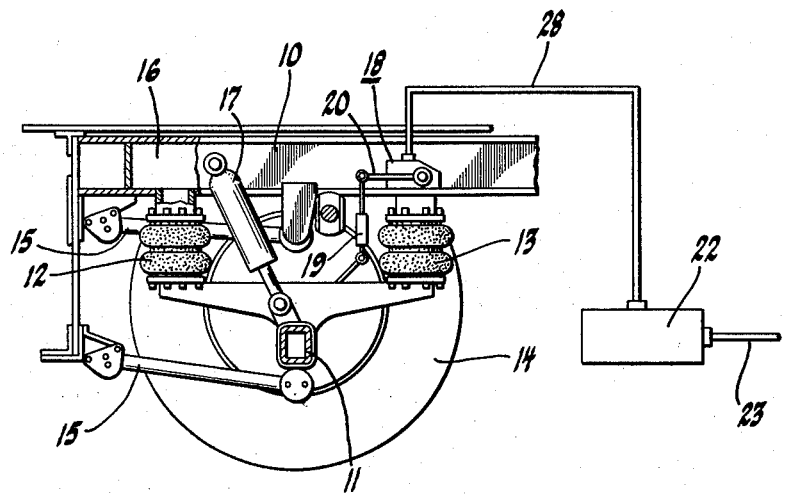
Figure 1 is an elevational view of a fluid suspension system in which features of this invention are incorporated.

In Figure 1 there is illustrated an air suspension system for a vehicle incorporating controls of this invention for regulating the air suspension system. In the structure of Figure 1 the vehicle chassis 10 is supported upon the axle 11 by means of resilient fluid springs 12 and 13. The springs 12 and 13 are preferably in the form of bellows structures adapted to contain air under pressure to support the chassis 10 at a predetermined clearance height or attitude relative to the axle 11. The axle 11 carries the conventional wheel 14. A pair of radius rods 15 are provided to maintain the axle 11 in position relative to the chassis 10.

The air springs 12 and 13 connect with the chamber 16 within the chassis 10 so that equivalent pressure is maintained in both springs 12 and 13. A shock absorber 17 connects between the axle 11 and the chassis 10 in conventional manner.

Air is supplied to the air springs 12 and 13 under regulation of a control valve 18 that has a link 19 connected between the actuating arm 20 of the valve 18 and the axle 11, whereby displacement of the chassis 10 relative to the axle 11 is detected by the link 19 and transferred to the valve 18 for opening the valve to allow air to flow from the reservoir 22 into the air springs, or to exhaust air from the air springs, depending upon whether load in the vehicle has been increased or decreased. The reservoir is supplied with air under pressure from a pump source (not shown) through a pipe line 23.

Figure 2:
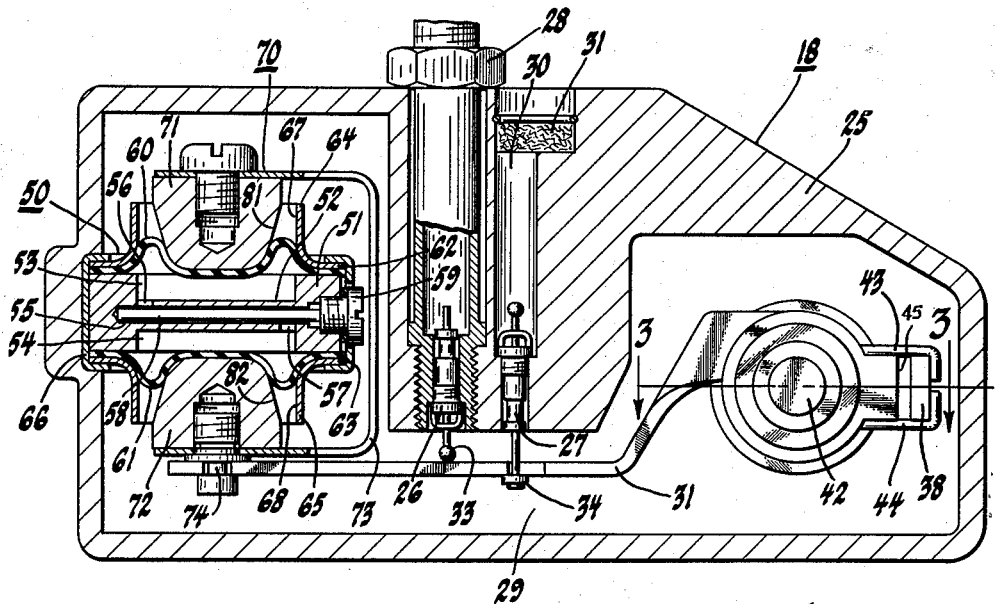
Figure 2 is a cross sectional view of a control valve incorporating features of the invention.

The control valve 18 is more particularly illustrated in Figures 2 and 3 and consists of a body 25 containing a pair of valves 26 and 27. The valves 26 and 27 are similar to conventional tire valves and are disposed in the body 25 in opposite relationship so that the valve 26 acts as an air inlet valve for allowing air to flow through the inlet pipe 28 into the interior cavity 29 of the body 25 while the valve 27 provides for exhaust of air from the chamber 29 through the exhaust opening 30 that contains a filter and silencer 31.

The valves 26 and 27 are actuated by an arm 31 that is carried on an oscillating shaft 32, the arm 31 being free on the shaft 32 so that the shaft is free to oscillate with reference to the arm 31. The stem 33 of the valve 26 is engaged by the arm 31 on upward movement of the arm while the stem 34 of the valve 27 is enegaged on downward movement of the arm 31 whereby the valves are operated upon opposite movement of the arm 31.

The oscillating shaft 32 is supported in the housing 25 in an extending boss 35 by means of a rubber sleeve 36 that is under compression between shaft 32 and the boss 35 to prevent escape of air from the chamber 29 and provide a bearing support for the shaft 32. The shaft 32 has a splined portion 37 on which a lever arm 38 is fixedly secured so that the lever arm 38 oscillates with the shaft 32. A torsion spring 40 surrounds a spacer 41 provided on the shaft portion 42 with opposite ends 43 and 44 of the torsion spring engaging the lever arm 38, as shown in Figure 2. The arm 31 has an arm portion 45 that is parallel with the lever arm 38 and is confined between the ends 43 and 44 of the torsion spring, as shown in Figure 2. Thus when the arm 38 oscillates with the shaft 32 the ends 43 and 44 of the torsion spring tend to carry the arm 31 through similar and equivalent movement. The arm 31 is prevented from following the movement of the lever arm 38 by a detaining or dash pot device 50. The detaining device consists of a cylinder 51 having a transverse wall 52 that divides the cylinder into two compartments 53 and 54. The wall 52 has a bore 55 connected with the compartments 53 and 54 by means of ports 56 and 57 to provide for interflow of liquid between the compartments 53 and 54. A pin 58 is placed in the bore 55, the clearance between the bore and the pin providing for resistance flow of liquid between the chambers 53 and 54. The bore 55 is closed at one end by a screw 59.

The chambers 53 and 54 are closed at their open ends by flexible diaphragms 60 and 61 that are formed of a rubber-like material. The diaphragms are retained on the end surfaces of the cylinder 51 by the radial flanges 62 and 63 of the sleeves 64 and 65 as held in position by the annular sleeve 66 having the opposite ends thereof turned over the flanges 62 and 63. The inner wall surfaces 67 and 68 respectively are true cylindrical surfaces coaxial with the axis of the cylinder 51.

The movable member 70 of the dash pot or detaining device 50 consists of a pair of cylindrical plugs 71 and 72 carried on opposite ends of a U-shaped spring 73. The plugs 71 and 72 engage the central areas of the diaphragms 60 and 61 whereby to place the liquid in the chambers 53 and 54 under pressure created by the spring 73. Thus the expansion or contraction of the liquid in the chambers 53 and 54 as a result of temperature changes of the environment of the valve 18 will not affect operation of the detaining device, such as would occur in the event of creation of voids in the chambers 53 and 54 upon contraction of the liquid under low temperature conditions. The movable member 70 is thus caused to accurately follow a displacement of liquid in the chambers 53 and 54.

The movable member 70 is connected to the arm 31 by the connection 74 so that the arm 31 will not be permitted to follow rapid oscillatory movements of the arm 38, but rather the movement of the arm 31 will reflect changes in height relation between the chassis 10 and the axle 11 resulting from changes in load in the vehicle. The detaining device 50 is adapted to provide for an averaging of the rapid oscillatory movements imparted to the control arm 20 of the valve when the wheel 14 of the vehicle is passing over rough road conditions.

Normally there are two conditions of operation that are required to be met by the control valve 18. The first condition is when a vehicle is standing still and passengers are either loading or leaving the vehicle. Under this condition there is a substantial change of load in the vehicle that causes the chassis 10 to move downwardly relative to the axle 11 or rise therefrom depending upon whether the vehicle is being loaded or unloaded. Under this condition it is desirable for the control valve 18 to respond promptly to the change in loading condition of the vehicle to obtain an immediate height correction between the chassis and axle of the vehicle to reestablish a normal predetermined clearance height.

To meet the aforementioned condition the detaining device or dash pot 50 is required to have a low value of internal restriction through the bore 55 so that the delay time required for the arm 31 to move the valves 26 or 27 is what is termed a "short delay," for example one-half second or less. That is, the response time for opening the valves 26 or 27 shall be not more than one-half second after the load has been applied or removed from the body of the vehicle. Under this condition therefore the movement of the arm 31 will substantially immediately follow oscillations of the arm 38.

While the incorporation of a low resistance factor or short delay time in the valve 18 is satisfactory for "static" conditions, when the vehicle is driven over the road resulting in a second "dynamic" road operating condition, the short delay time incorporated in the dash pot or detaining device will allow the operating arm 31 to follow the wheel oscillations too closely with the result that a large volume of air is continuously being supplied and exhausted to and from the air springs. This requires a high volume source of air pressure supply which on the average passenger vehicle creates a problem of compressor size.

Therefore, under "dynamic" road operating conditions it is desirable for the resistance factor through the bore 55 of the detaining device 50 to be greater than under static loading conditions to provide for a longer delay or reaction time for movement of the arm 31 of the control 18 so that the rapid oscillations of the vehicle wheel will be substantially cancelled out and the valves 26 and 27 will remain closed under normal conditions so that substantially no air is used under the dynamic road operating conditions.

It is thus seen that the valve operating requirements under static loading conditions are quite different from the valve operating requirements under dynamic road operating conditions; a short delay factor of the operating valve being satisfactory for static loading conditions but unsatisfactory for road operating conditions whereas a long delay factor for the valve is unsatisfactory for static loading conditions but is satisfactory for dynamic road operating conditions.

To illustrate the problem graphically, the chart of Figure 5 illustrates valve operating conditions for short time delay periods under static loading conditions while the chart of Figure 6 illustrates the same valve operation under dynamic road operating conditions. In Figure 5 the full line represents a valve operation wherein the delay device 50 is provided with a short time delay, to wit one-half second or less. Under static loading conditions when passengers enter the vehicle, it will be noted that the full line of the chart peaks rapidly which indicates that the arm 31 substantially follows the compression of the air springs and at substantially the same rate so that the inlet valve 26 is opened quickly. Since the movement of the arm 31 substantially follows the movement of the air springs 12 and 13, when the air springs have reached their low peak of compression due to loading, the valve opening will have reached its high peak of opening, whereafter the air springs begin to expand with the result that the arm 31 begins to move to neutral to allow the valve 26 to close but at substantially the same rate of movement as the recovery of air springs. Thus the valve opening period is relatively short as represented on the horizontal line taken along the line marked "intake open." The short delay of the delay device 50 thus allows quick height correction between the chassis 10 and the axle 11.

On the other hand, the dash line represents the valve operation when the delay device 50 has a long delay incorporated therein, to wit, one and one-half to two seconds or greater. When the load is applied to the vehicle the rate of compression of the air springs will be greater than the rate of movement of the valve operating arm 31 so that the valve 26 will open a considerable time period after the air springs 12 and 13 are compressed, this being indicated by the decreased inclination of the dash line on the chart of Figure 5. After the valve arm 31 has reached the position to open the valve 26 air will be supplied into the air springs and the air springs will begin their recovery to the corrected height relation between the chassis and the axle, but since the delay device 50 is preventing movement of the arm 31 at the rate of recovery the springs 12 and 13 the valve will be open for a lesser degree of opening than under the "short delay" operation but for a greater time period with the result that the same volume of air is delivered into the air springs for height correction but over a longer period.

From the chart of Figure 5 it will therefore be obvious that the long delay period of the delay device 50 will not permit a prompt and rapid response of the valve 18 for immediate height correction either during a loading or an unloading operation since exactly the same type of valve operation occurs under either condition.

The chart of Figure 6 illustrates valve operation under dynamic road operating conditions wherein the curve line represents body swing or movement on both sides of a neutral or static height position. The full line, as in Fig. 5 represents valve operation wherein the delay device 50 is a "short delay." Here again the opening of the valve either for air inlet or for exhaust of air follows substantially the rate of movement of the swing of the body so that the valve is either permitting air to be delivered into the air springs or air to be exhausted from the air springs a substantial period of time with the result that a large volume of air is used by such a system. The control valve utilizing a short delay damping device is extremely sensitive to body swing or movement and is therefore not desirable since there is a tendency for vertical oscillation of the car body relative to the axle as a result of the extreme sensitivity of the valve.

The dash line represents valve operation wherein the damping device 50 is provided with a long delay period, that is one and one-half to two seconds or greater comparable to the illustration in Figure 5. As shown, the opening of the valve is delayed considerably behind the movement of the compression of the air springs thereby decreasing the sensitivity of the valve operation to the body swing or oscillation movements. Also, because of the longer delay action of the damping device 50, the peak of opening of the valve is considerably less than when using a short delay characteristic in the damping device and the valve will stay open for a shorter time period than when using a short delay characteristic in the damping device. The result is that the peak oscillations or body swing movement will not cause use of large volumes of air and the suspension system, because of the lesser sensitivity of the valve to the body swing, will be more stable.

But as previously noted the long time delay, even though advantageous under dynamic conditions, is unsatisfactory under static loading conditions.

It is therefore the purpose of this invention to provide a damping device or delay mechanism that will have the advantage of the quick response during static loading condition and will have the advantage of the long delay under dynamic road conditions. To accomplish this, the damping device 50 has the diaphragms 60 and 61 arranged to be in balance when the damping device 50 and the valve 18 are in neutral position. Movement of the damping device in either direction from neutral is at one rate of movement or time delay whereas the rate of the damping device to neutral is at a second and higher rate. Thus the damping device is capable of responding quickly under static load conditions to give an immediate height correction and is capable of returning the valve to neutral more quickly than if the delay period both from and back to neutral were of equivalent value. Advantage is gained in this operation over an arrangement in which the valve would have an immediate neutral or centering position without delay since under conditions of rapid axle oscillation the valve can be delayed sufficiently in its return to neutral to permit subsequent wheel oscillations to effect a gradual movement of the valve operating arm in one direction or the other, to wit, open the inlet valve 26 or open the exhaust valve 27, until a correction occurs in the air springs 12 and 13. If the valve is returned immediately to neutral after each oscillation, with no delay in the return to neutral, then the subsequent wheel oscillations require the valve arm 31 to move outwardly from neutral through exactly the same time delay so that even though the body moves downwardly toward the axle, or vice versa, away from the axle, there is a possibility that no height correction can be made in the air springs.

The gradual downward movement of the body toward the axle is caused under dynamic road operating conditions by the shock absorber since conventional shock absorbers are constructed with the control valve for the rebound stroke of the shock absorber provided with a resistance factor that is greater than the resistance factor of the valving for the compression stroke. The result is that when operating on rough road conditions, the shock absorber gradually pulls the body down toward the axle since on each rebound stroke the shock absorber cannot return to exactly the same length it had before the compression stroke. To offset this condition the control valve 18 of the air suspension system will open the valve 26 when the predetermined height clearance between the body and the axle have reduced a predetermined amount.

To allow this correction to take place, the damping device 50 of this invention effects a time delay on the return of the valve to neutral so that the cumulative effect of the rapid oscillations of the wheel axle will be such that the valve will ultimately open to effect a height correction between the body 10 and the axle 11 to overcome the pull down effect of the shock absorber 17.

To accomplish the foregoing result the damping device 50 has the two cylindrical plugs 71 and 72 of the movable member 70 provided with frusto conical shaped walls 81 and 82. When the elements 71 and 72 are in the position illustrated in Fig. 2, spring 73 applies pressure to the fluid in the chambers 53 and 54 there is a state of equilibrium of the hydraulic pressure within the damping device that maintains the movable member 70 in a neutral position. However, when the movable member 70 moves from the position shown in Fig. 2 to a position such as that illustrated in Fig. 4 the effective area A of the diaphragm 61 becomes less than the effective area B of the diaphragm 60. Since the liquid in the chambers 53 and 54, is held under pressure, the normal tendency of the device is to reestablish a state of equilibrium such that the effective areas of the diaphragms are equivalent and thereby obtain a condition of stability in the damping device.

Since the effective area of the diaphragm 61 is less than the effective area of the diaphragm 60 when the movable member 70 is in the position illustrated in Fig. 4 the movable member will always be urged toward neutral position when it has once been moved from the neutral position in either direction. Since the force urging the movable member 70 to neutral position is a force in addition to the force applied to the arm 31 to move it to neutral the forces are additive so that the movable member 70 tends to return to neutral at a greater rate than it moved from neutral.

This is graphically illustrated in Fig. 5 wherein the dotted line represents operation of the valve 18 with the detaining device 50 arranged as illustrated in Figures 2 and 4. With the detaining device 50 provided with a short delay, the reaction time of the valve 18 under static loading conditions is prompt so that the arm 31 of the valve substantially follows the rate of compression of the air springs on static loading with the result that an immediate height correction is obtained. Since the valve returns to neutral under a delay rate that is less than the delay rate on moving from neutral the valve opening time will be less than if the delay rate is the same both from and return to neutral. Obviously the reaction time of the valve using the delay device 50 as illustrated in Figs. 2 and 4 is less than the reaction time of a valve using a long delay as represented by the dash line of Figure 5.

Under dynamic road operating conditions, as illustrated in Fig. 6, the dotted line represents the operation of the valve of Fig. 2. With the delay device as shown in Figs. 2 and 4 effecting a short delay on opening of the valve, the arm 31 will substantially follow the rate of compression of the air springs so that the valve will open promptly, but with the return to neutral being at a greater rate than the rate of movement away from neutral, the actual opening time of the valve will not be substantially greater than the opening time of the valve as provided by one which has a long delay return as graphically illustrated by the dash line of Figure 6. Thus under dynamic conditions the period of opening of the valve 18, either for inlet of air or exhaust of air from the air springs is such that the valve will respond to an average of the movements of the body in substantially the same manner that would average the body movements under a long delay operation of the detaining device 50. Thus the advantages of the short delay for immediate height correction under static conditions with long delay for averaging body oscillations under dynamic conditions is obtained.

While the form of embodiment of the invention as herein disclosed constitutes a preferred form, it is to be understood that other forms might be adopted as may come within the scope of the claims which follow.

What is claimed is as follows.

1. In a suspension system for a vehicle having a sprung mass and an unsprung mass, the combination of, fluid actuated spring means supporting the sprung mass on the unsprung mass, a source of fluid pressure, valve means having a neutral inactive position with movement from neutral in one direction regulating supply of fluid from said source to said spring means and movement in the opposite direction from neutral regulating exhaust of fluid from said spring means to maintain a predetermined height attitude between the sprung mass and the unsprung mass, a liquid filled damping device connected with said valve means to effect a time delay in the operation of the valve means between the occurrence of movement between the sprung mass and the unsprung mass before the valve means becomes effective for supply or exhaust of fluid, and resilient pressure means applying pressure on the liquid of said damping device to establish a pressure balance in the damping device normally to position the damping device and the valve means in a neutral position, said resilient pressure means being effective during movement of the damping device and the valve means from neutral position in either direction to establish a pressure unbalance in the damping means to create force effective equivalently in either direction of movement of the damping device toward neutral position to provide a faster rate of travel of the valve means on return to neutral position than in movement from neutral position.

2. In a suspension system for a vehicle having a sprung mass and an unsprung mass with a fluid actuated spring means supporting the sprung mass on the unsprung mass and adapted for connection to a source of fluid pressure with control means regulating supply of fluid from said source to said spring means and exhaust of fluid therefrom to maintain a predetermined height relation between the sprung mass and the unsprung mass and having a delay means connected with said control means to effect a time delay between the occurrence of movement between the sprung mass and the unsprung mass before said control means is effective for supply or exhaust of fluid, said delay means comprising, means forming a chamber, said chamber being filled with a fluid, means dividing the chamber into two compartments, means restricting flow of fluid between said compartments, means movable in the compartments to effect displacement of fluid between the compartments under control of the restricting means, and force means active with said movable means normally to maintain the movable means in a neutral position of stable equilibrium from which neutral position said movable means is movable into a state of instability at one rate of movement under control of said restricting means and to which the movable means is returned at a greater rate of movement by said force means reestablishing the state of equilibrium.

3. Apparatus for controlling the suspension system of a vehicle having a sprung mass supported on an unsprung mass by a resilient fluid spring, comprising, valve means for controlling supply of pressure fluid to an air spring and exhaust of pressure fluid therefrom, a control arm engaging said valve means to actuate the same, said control arm being actuated in response to movement of the sprung mass relative to the unsprung mass, a fluid filled dash pot having a movable member connected to said control arm to effect a time delay between the occurrence of movement between the sprung mass and the unsprung mass before said valve means is effective to supply or exhaust fluid and including force applying means placing the fluid of the dash pot under pressure and effect thereby a state of equilibrium retaining the said movable member in its neutral position and to reestablish the said state after the movable member is moved in either direction from its normal neutral position.

4. Apparatus for controlling the suspension system of a vehicle having a sprung mass supported on an unsprung mass by a resilient fluid spring, comprising, valve means for controlling supply of pressure fluid to an air spring and exhaust of pressure fluid therefrom, a control arm engaging said valve means to actuate the same, said control arm being actuated in response to movement between the sprung mass and the unsprung mass representing a change in height clearance between the sprung mass and the unsprung mass, a fluid filled dash pot having a pair of compartments with resistance means therebetween through which fluid is displaced between the compartments with each compartment closed by a flexible diaphragm, movable members engaging the flexible diaphragms for said compartments and spring urged against the said diaphragms, said movable members being tapered inwardly toward one another whereby to form tapered side walls on the members engaged by the respective diaphragms, said members being interconnected for movement in substantially unison movement whereby to cause a change in effective area of one diaphragm relative to the other and establish an unbalance of fluid pressure within the dash pot which tends to urge the movable members to a neutral position by establishing equilibrium of forces within the dash pot.

5. In a control device for controlling the suspension system of a vehicle having a sprung mass supported on an unsprung mass by a resilient fluid spring, a fluid delay device, comprising, means forming a pair of adjacent chambers filled with a fluid, passage means between the chambers forming a resistance passage for displacement of fluid between the said chambers, said chambers being each closed by a flexible diaphragm, a movable member engaging each of said diaphragms, said movable members being interconnected by means forming a spring tension upon the said members whereby to place the fluid in said chambers under compression by said members, said members having the portions thereof engaging said diaphragms in the form of truncated cones whereby normally to establish equilibrium of forces within the dash pot to position said movable members in a neutral position, movement of said movable members in unison in either direction from a neutral position effecting a change in effective area of one diaphragm relative to the other whereby to establish an unbalance of hydraulic forces internally of said dash pot which tends normally to return said movable devices to their neutral position.

6. In a control device for controlling the suspension system of a vehicle having a sprung mass supported on an unsprung mass by a resilient fluid spring, a fluid delay device, comprising, means forming a pair of adjacent chambers filled with a fluid, passage means between the chambers forming a resistance passage for displacement of fluid between the said chambers, said chambers being each closed by a flexible diaphragm, and means engaging said diaphragms applying pressure to the same to maintain the liquid in said chambers under pressure irrespective of expansion or contraction of the liquid.

7. In a control device for controlling the suspension system of a vehicle having a sprung mass supported on an unsprung mass by a resilient fluid spring, a fluid delay device, comprising, means forming a pair of adjacent chambers filled with a fluid, passage means between the chambers forming a resistance passage for displacement of fluid between the said chambers, said chambers being each closed by a flexible diaphragm, and equivalently acting pressure providing means acting on each of said diaphragms to maintain the liquid in said chambers under pressure and in constant engagement with said diaphragms to position them in a predetermined neutral position irrespective of contraction and expansion of the liquid whereby to maintain uniformity of operation of the said device.

8. In a control device for controlling the suspension system of a vehicle having a sprung mass supported on an unsprung mass by a resilient fluid spring, a fluid delay device, comprising, means forming a pair of adjacent chambers filled with a fluid, passage means between the chambers forming a resistance passage for displacement of fluid between the said chambers, said chambers being each closed by a flexible diaphragm, a movable member engaging each of said diaphragms, and spring means engaging the movable member continuously urging the same against said diaphragms to maintain the liquid in said chambers under pressure thereby and maintain the liquid in the chambers in constant engagement with said diaphragms to compensate for contraction and expansion of the liquid.

9. In a suspension system for a vehicle having a sprung mass and an unsprung mass, the combination of, fluid actuated spring means supporting the sprung mass on the unsprung mass, a source of fluid pressure, valve means having a neutral inactive position with movement from neutral in one direction regulating supply of fluid from said source to said spring means and movement in the opposite direction from neutral regulating exhaust of fluid from said spring means to maintain a predetermined height attitude between the sprung mass and the unsprung mass, a fluid damping device connected with said valve means to effect a time delay in the operation of the valve means between the occurrence of movement between the sprung mass and the unsprung mass before the valve means becomes effective for supply or exhaust of fluid, and spring means of equivalent value placed in opposed relationship on opposite sides of a connecting link between the valve means and said delay device to effect a pressure balance on the fluid damping device normally to position the damping device and the valve means in a neutral position and effective during movement of the damping device and the valve means toward neutral position to provide for a faster rate of travel of the valve means on return to neutral position than in movement from neutral position.

10. In a suspension system for a vehicle having a sprung mass and an unsprung mass, the combination of, fluid actuated spring means supporting the sprung mass on the unsprung mass, a source of fluid pressure, valve means having a neutral inactive position with movement from neutral in one direction regulating supply of fluid from said source to said spring means and movement in the opposite direction from neutral regulating exhaust of fluid from said spring means to maintain a predetermined height attitude between the sprung mass and the unsprung mass, a fluid damping device connected with said valve means to effect a time delay in the operation of the valve means between the occurrence of movement between the sprung mass and the unsprung mass before the valve means becomes effective for supply or exhaust of fluid, and means placing the fluid in said fluid damping device under pressure to create internal pressure in the device effective normally to position the damping device and the valve means in an intermediate or neutral position and effective during movement of the damping device and the valve means toward neutral position to provide for a faster rate of travel of the valve means on return to neutral position than in movement from neutral position.

11. Apparatus constructed in accordance with claim 8 in which the movable member is in the form of a truncated cone with the smaller area end positioned in engagement with the diaphragm.

12. Apparatus constructed in accordance with claim 8 in which the movable member is in the form of a truncated cone with the smaller area end positioned in engagement with the diaphragm, said movable members being movable concurrently in the same direction whereby to cause a change in effective area of one diaphragm relative to the other and establish an unbalance of fluid pressure within the delay device which tends to urge the movable members to a neutral position by establishment of equilibrium of forces within the said chambers.

13. A fluid delay device, comprising, means forming a pair of adjacent chambers filled with a liquid, passage means between the chambers forming a resistance passage for displacement of liquid between the said chambers, said chambers being each closed by a flexible diaphragm rigidly supported only at the periphery of the respective diaphragm, force applying means engaging said diaphragms at their unsupported central areas and applying pressure thereon concurrently continuously urging said diaphragms into their respective chambers closed thereby maintaining the liquid in the said chambers constantly under pressure and in engagement with the diaphragms irrespective of their positions in the respective chambers whereby to provide for compensation of contraction and expansion of the liquid.

14. A fluid delay device, comprising, means forming a pair of adjacent chambers filled with a liquid, passage means between the chambers forming a resistance passage for displacement of liquid between the said chambers, said chambers being each closed by a flexible diaphragm, means engaging said diaphragms and applying pressure thereon concurrently continuously urging said diaphragms into their respective chambers closed thereby maintaining the fluid in the said chambers constantly under pressure and in engagement with the diaphragms irrespective of their positions in the respective chambers with internal hydraulic forces being in balance and engaging said diaphragms to position the diaphragms in a neutral position, said means engaging said diaphragms being movable concurrently in the same direction and having contoured faces engaging said diaphragms effecting an unbalance of forces internally of the said chambers on said movement of the said means acting on said diaphragms to urge the same to return to their neutral position at a faster rate of movement than their movement from neutral position.

15. Apparatus constructed and arranged in accordance with claim 10 wherein the rate of movement of the damping device and the valve means from neutral position is the same rate in either direction of movement from neutral position and the rate of return to neutral position is the faster rate of travel that is the same rate of return for either direction of movement to neutral position.

References Cited in the file of this patent

UNITED STATES PATENTS

| | | |
|---|---|---|
| 1,304,311 | Heldrich | May 20, 1919 |
| 2,112,059 | Arthur | Mar. 22, 1938 |
| 2,361,575 | Thompson | Oct. 31, 1944 |
| 2,670,201 | Rossman | Feb. 23, 1954 |
| 2,844,384 | Jackson | July 22, 1958 |

OTHER REFERENCES

German Printed Application, H17488II/63C, March 1, 1956.